Aug. 1, 1967  R. L. MORA  3,333,386
STRUCTURAL REINFORCEMENT ASSEMBLY
Filed April 9, 1964  2 Sheets-Sheet 1

INVENTOR.
RAUL L. MORA

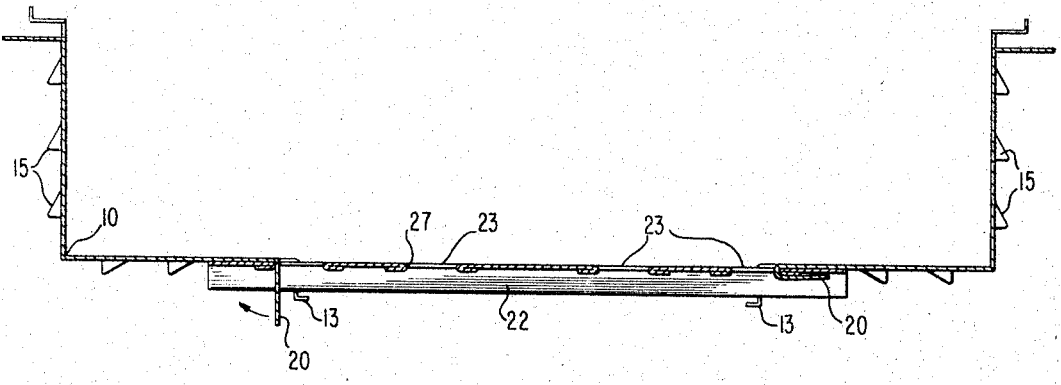
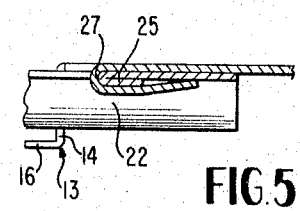
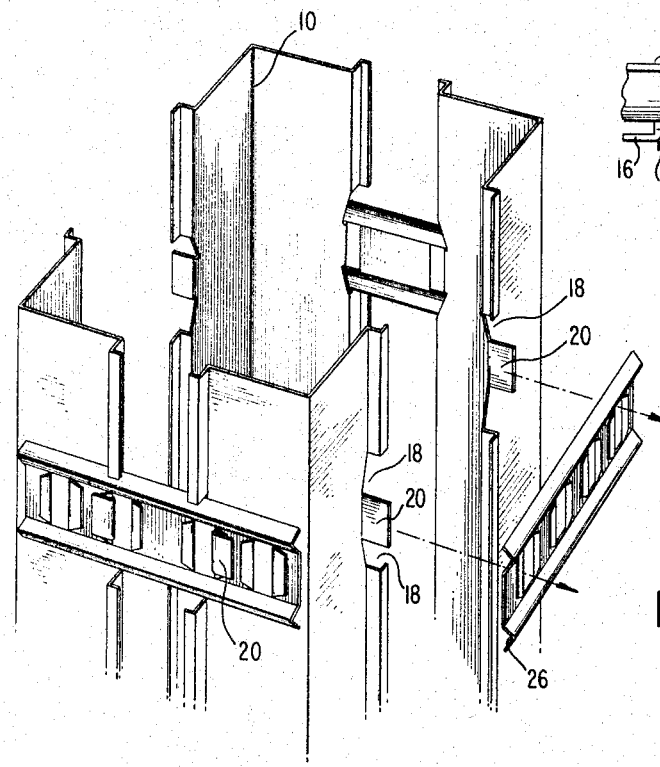

United States Patent Office 3,333,386
Patented Aug. 1, 1967

3,333,386
STRUCTURAL REINFORCEMENT ASSEMBLY
Raul L. Mora, 3230 SW. 23rd Court,
Fort Lauderdale, Fla. 33312
Filed Apr. 9, 1964, Ser. No. 358,565
11 Claims. (Cl. 52—650)

This invention generally relates to reinforcement of structural members and more specifically to a novel structural reinforcement assembly particularly suitable for use in the construction of load bearing columns.

In the past, the structural reinforcement of columns has been accomplished by several methods the most common of which utilizes cylindrical steel bars which are interconnected by tie rods in a rather elaborate fashion conforming to local building codes. This method of reinforcement has proven to be relatively costly particularly from the standpoint of the labor required to position and assemble the reinforcing bars and tie rods especially when done at the job site. Moreover, in order to conform to present-day building codes, the utilization of this method in many instances has resulted in over-reinforcement or a waste of the employed reinforcing material thereby further increasing construction costs.

Other column reinforcement methods have utilized right angle irons which, because of their cross-sectional shape, exhibit improved rigidity characteristics when compared to that of cylindrical reinforcing bars of equal cross-sectional area. However, angle irons are expensive in relation to over-all costs and further require costly and skillful assembly techniques such as welding, riveting, or bolting.

Accordingly, one of the principal objects of the present invention is to provide a novel structural reinforcement assembly that will exhibit improved rigidity and flexure characteristics and yet consists of a minimum number of components which may be economically manufactured and quickly and easily assembled on or off the job site. Included in this object is the provision of such a reinforcement assembly which, in its assembly operation, obviates the need for conventional securement methods such as welding, riveting, or bolting while requiring no special tools and only a minimum of skill.

Another object of the present invention is to provide a structural reinforcement assembly that is highly adaptable to the particular size and strength requirements of the column to be reinforced thereby as well as to changed conditions which may occur at the job site. Included in this object is the provision of such a reinforcement assembly which, prior to final assembly, uniquely facilitates the positioning of its component parts into one or more different dimensional arrangements depending on the cross-sectional length or width of the column to be reinforced thereby.

A further object of the present invention is to provide a structural reinforcement assembly in which the cross-sectional area of its constituent reinforcing members may be conveniently increased, even at the job site, and without correspondingly increasing the number of interconnecting strap members or the complexity of the final assembly operation.

A still further object of the present invention is to provide such a reinforcing assembly wherein separate longitudinally successive reinforcing members may be spliced or joined by the same means employed to interconnect laterally spaced reinforcing members.

Other objects and the entire scope of the present invention will become apparent from the following detailed description and by reference to the accompanying drawings. It should be understood, however, that the detailed description and specific examples, while indicating preferred embodiments of the invention, are given by way of illustration only, since various changes and modifications within the spirit and scope of the invention will become apparent as the description herein progresses. Reference now being made to the accompanying drawings wherein like numerals refer to similar parts throughout, and in which:

FIGURE 4 is an enlarged cross-sectional view taken generally along lines 4—4 of FIGURE 2 but with an attachment tab shown in a pre-assembly position;

FIGURE 5 is an enlarged view of the right-hand portion of FIGURE 4 showing an attachment tab in final position; and FIGURE 6 is a fragmental perspective view, partly exploded, of a reinforcement assembly forming a different rectangular pattern and shown in partially assembled condition.

Figure 1:
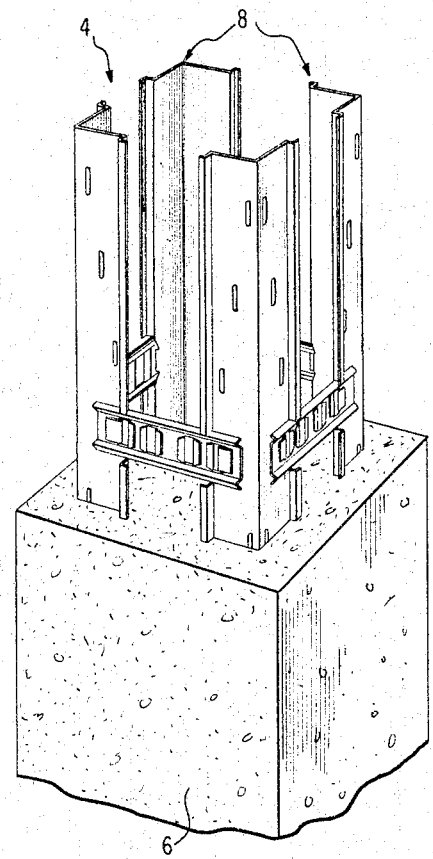
FIGURE 1 is a fragmental perspective view of a column incorporating a reinforcement assembly embodying the present invention, the column being broken away to show the reinforcement assembly.

Referring to the drawings in detail, an embodiment of the reinforcement assembly of the invention, generally designated 4, is shown in FIGURE 1 for illustrative purposes as being incorporated in a rectangular column 6 such as may be formed from concrete which has been either pre-cast or poured in place. The reinforcement assembly 4 includes four elongated identical reinforcing members 8, each of which has been formed from sheet steel or other suitable material of uniform thickness that has been bent along a longitudinal fold line 10 to provide a pair of mutually perpendicular planar legs 12 of equal width. As shown in FIGURE 1, the reinforcing members 8 are arranged in laterally spaced relationship so as to define the corners of a rectangular frame.

In the preferred embodiment, the terminal edges of the legs 12 are formed with a series of longitudinally extending integral lips 13 shown as including a first portion 14 outwardly projecting perpendicularly from the legs 12 and a second portion 16 projecting laterally inwardly at right angles from the first lip portion 14. The lips 13 serve to impart reinforcement to the structural members themselves as well as to increase the bond between the reinforcement assembly 4 and column 6. If desired, staggered portions of the legs 12 may be lanced and bent outwardly so as to provide teeth 15 which also serve to anchor the assembly 4 relative to the column 6.

Intermediate successive lips 13 on each of the legs 12, there is integrally formed an attachment ear or tab 20 which projects outwardly from the edge of the leg 12 at right angles thereto and beyond the lips 13 as best shown in FIGURE 6. The tabs 20, whose purpose will be subsequently described in detail, are illustrated as being rectangular and spaced from the ends of the adjacent lips 13 by recesses 18 formed by cutting out appropriate segments of the edge portions of the legs 12.

The reinforcing members 8 are secured in their rectangular arrangement at longitudinal intervals by means of four cross-straps 22 which are also formed from sheet steel or other suitable material. The cross-straps 22 are each provided with a series of longitudinally spaced apertures 24 dimensioned to receive one or more of the tabs 20 of the reinforcing members 8. In the illustrated embodiment the apertures are four in number and are formed by bending back rectangular segments 25 of the cross-straps 22. In the preferred embodiment, the side edge portions of the cross-straps 22 are bent to define V-shaped channels 26 which serve to enhance the strength of the cross-straps.

In securing the reinforcing members 8, the cross-straps 22 are oriented with their V channels 26 facing the reinforcing members 8 (see FIGURE 6) and then the cross-strap apertures 23 are fitted over an associated pair of tabs 20 on the reinforcing members 8. The desired lateral spacing between the reinforcing members 8 is obtained by utilizing the appropriate pair of apertures 23 in each cross-strap 22 and in this regard the cross-straps 22 may be provided with indicia (not shown) calibrated to show the over-all rectangular length or width of the frame that will be obtained for a particular pair of cross-plate apertures 23. This not only avoids the need for measurement and the consequent chances of error, but further highly facilitates the relative positioning of the reinforcing members 8. FIGURE 6 illustrates a frame of a different rectangular dimension than that of FIGURE 1, obtained by employing a different pair of apertures 23 in two opposite cross-plates 22.

Continuing in the assembly operation, after the cross-straps 22 have been fitted on the appropriate tabs 20 (such as partly shown by the left-hand tab 20 in FIGURE 4), the tabs 20 are then merely peened back, such as with a hammer, into engagement with the outer surface of the cross-straps 22 as shown in FIGURE 5. Before peening, however, the tabs 20 should engage the outer edge 27 of the associated apertures 23 in order to insure an effective attachment. In this regard, referring to FIGURE 5, the bent-back segments 27 of the cross-straps 22 aid in providing a firm attachment.

It will be appreciated readily that the above assembly operation may be effected quite simply and with a minimum of manpower. In addition to substantially reducing the cost and effort required in the fabrication of the reinforcing skeleton, the reinforcement assembly of the present invention further possesses highly desirable rigidity and flexure characteristics because of the L shape of the cross section of the component reinforcing members 8. This shape provides a greater radius of gyration, the determinant of rigidity, when compared to that provided by a circular cross section of equal area. Furthermore, the reinforcing members 8 and cross-plates 22 are relatively light in weight and may be economically manufactured from sheet material and in sizes that will efficiently utilize the full strength of the reinforcing material employed.

Figure 2:
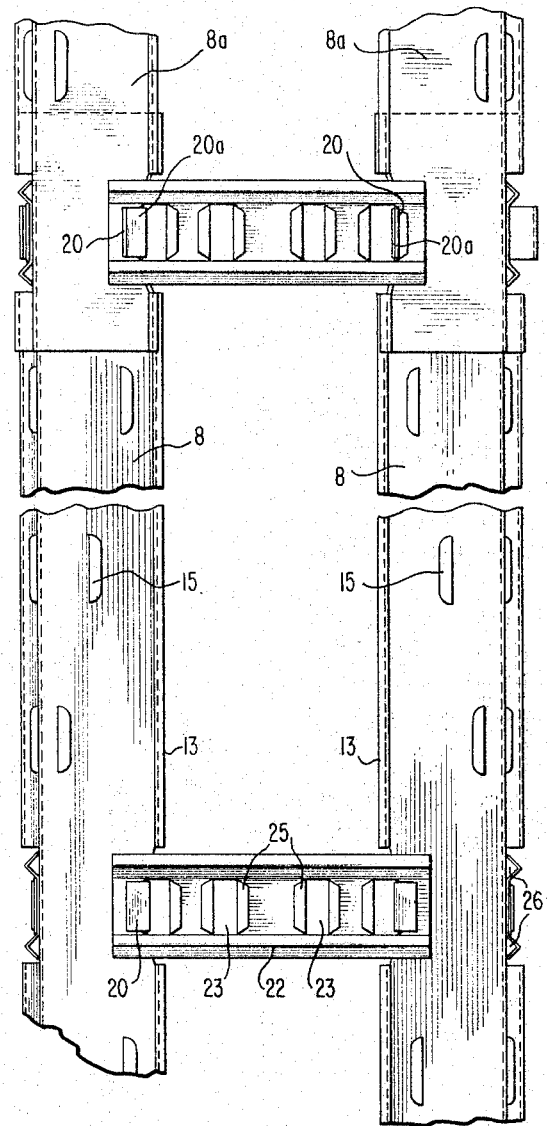
FIGURE 2 is an enlarged fragmental side view of a reinforcement assembly similar to FIGURE 1 but additionally showing a joint between vertically successive reinforcing members.

The present invention is uniquely adaptable to situations where the splicing of two vertically successive reinforcing members is desired. Referring to FIGURE 2, there are illustrated two pairs of longitudinally successive reinforcing members 8 and 8a which are joined by nesting the end portion of the upper reinforcing members 8a behind the end portion of the lower reinforcing members 8 with the tabs 20a of the upper reinforcing members 8a received through the same cross-strap apertures 23 which receive the tabs 20 of the lower reinforcing members 8. The tabs 20a of the upper reinforcing members 8a are finally secured by bending them into engagement with the tabs 20 of the lower reinforcing members 8. Thus, it will be seen that successive reinforcing members may be joined together by the same cross-strap utilized to laterally interconnect the cross-members.

Figure 3:
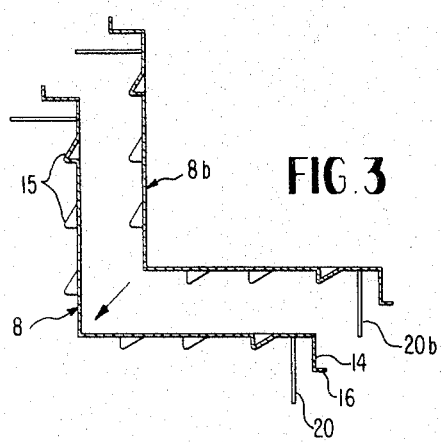
FIGURE 3 is an enlarged assembly view in cross section of one corner of the reinforcement assembly utilizing a pair of nesting reinforcing members.

Referring to FIGURE 3, the present invention is also adaptable to situations where there is required a greater cross-sectional area of reinforcing member than that provided by one of the reinforcing members 8. This is conveniently accomplished by superimposing two or more reinforcing members 8 and 8b one behind the other in nesting relationship. The tabs 20 and 20b of the reinforcing members 8 and 8b also being superimposed, are then passed through the same apertures in the cross-straps 22 and bent back in the same manner described above in connection with the splicing of the vertically successive reinforcing members 8 and 8a (see FIGURE 2). Thus, the present invention permits the cross-sectional area of the reinforcing members to be increased as desired without necessitating additional cross-straps or extending the complexity of assembly.

It is to be understood that, although several preferred embodiments of the invention have been shown in the drawings and described with considerable particularity in the foregoing specification, the invention is not limited to the specific details of construction, shown and described, but includes all modifications coming within the scope of the appended claims and their equivalents.

What is claimed is:

1. A structural reinforcement assembly for use in a column and the like comprising four angle members formed of sheet material and arranged to define the corners of a rectangular frame, the angle members each including a pair of mutually perpendicular legs each having an outwardly extending integral preformed tab at a number of longitudinally spaced locations thereon, four cross-straps each extending laterally between two of said angle members and having at least one pair of preformed apertures respectively receiving two of the tabs of said two angle members with the tabs bent outwardly toward the associated angle member and into engagement with the outer surface of said cross-strap to thereby interconnect and maintain the angle members in laterally spaced relationship.

2. The reinforcing assembly as defined in claim 1 wherein the angle members and the cross-straps are formed from sheet metal and said tabs are formed integrally with the legs of said angle members.

3. A structural reinforcement assembly for use in a load bearing column and the like comprising a plurality of elongated angle members formed of sheet material and adapted to be vertically oriented in the column, said angle members each including a pair of legs each having a number of integral preformed deformable projections extending outwardly therefrom, and a number of cross-straps each having at least two longitudinally spaced preformed apertures dimensioned to receive said projections, two of said angle members being interconnectable in laterally spaced relationship by inserting two of the projections thereof through the apertures of a cross-strap and deforming said projections into overlying relationship with the cross-strap.

4. The assembly as defined in claim 3 wherein said cross-strap is provided with additional longitudinally spaced preformed apertures dimensioned to receive said projections whereby the angle members may be interconnected in a plurality of different preselectable spaced relationships.

5. A structural reinforcement assembly for use in a load bearing column and the like comprising a plurality of elongated angle members adapted to be vertically oriented in the column, said angle members each including a pair of legs each having a number of deformable projections extending outwardly therefrom, and a number of cross-straps each having at least two longitudinally spaced apertures dimensioned to receive said projections, two of said angle members being interconnectable in laterally spaced relationship by inserting two of the projections thereof through the apertures of a cross-strap and deforming said projections into overlying relationship with the cross-strap, each angle member further having a series of spaced longitudinal lips projecting outwardly from the edges of the legs thereof, and said projections extending beyond said lips from edge portions of said legs located between said lips.

6. The assembly as defined in claim 5 wherein said cross-straps and angle members are formed from sheet metal and said lips and projections are integrally formed with said legs.

7. In a column a structural reinforcement assembly comprising four vertical angle members formed of sheet material arranged to define the corners of a rectangular frame, each angle member including a pair of mutually perpendicular legs each having an outwardly extending integral preformed tab, a plurality of cross-straps each extending transversely between the angle members and having at least one pair of longitudinally spaced preformed apertures respectively receiving two of the tabs of two adjacent angle members with said two tabs bent into engagement with the surface of the cross-strap, and a number of additional angle members identical to said first mentioned angle members arranged in superimposed nesting relationship behind a number of said first mentioned angle members, said additional angle members each having tabs received through the same cross-strap apertures which receive the tabs of the associated angle member with which nested and being in overlying engagement with the tabs of the associated angle member respectively.

8. A structural reinforcing assembly for use in a column and the like comprising a plurality of angle members defining the corners of a frame, the angle members formed of sheet material each having opposite legs formed with outwardly extending integral preformed tabs, a plurality of cross-straps extending transversely between adjacent angle members and each having at least one pair of preformed apertures receiving two tabs of the adjacent angle members respectively with the tabs bent into overlying relationship with the outer surface of the cross-strap to thereby secure the angle members in spaced relationship, at least one additional angle member positioned longitudinally beyond one of said first mentioned angle members with the end portion of said additional angle member superimposed in nesting relationship behind the end portion of said one of said first mentioned angle members, said additional angle member having an outwardly projecting integral preformed tab extending through one of said apertures of the cross-strap and bent over and into engagement with one of the tabs of said one of said first mentioned angle members to thereby join said additional angle member thereto.

9. A structural reinforcement assembly for columns and the like comprising four elongated right angle reinforcing members arranged to define the corners of a rectangular frame, each reinforcing member having a pair of legs each having an outwardly projecting tab located at a number of longitudinally spaced intervals along the terminal edge of the leg, four cross-straps each transversely extending between a pair of adjacent angle members and each having a plurality of apertures spaced longitudinally thereof, two of said apertures of each cross-strap respectively receiving two tabs of two adjacent angle members with said two tabs bent into engagement with the outer surface of said cross-strap, and a pair of longitudinal lips formed on the edges of each of said legs and terminating on opposite sides of said tabs adjacent the longitudinal edges of said cross-straps.

10. The assembly as defined in claim 9 wherein said lips have an L shape and wherein said cross-straps having V shape channels formed along the opposite sides thereof.

11. A structural reinforcement member for use in a concrete column and the like; the member comprising an elongated sheet metal body including a pair of legs extending in angular interrelationship, a series of longitudinally spaced elongated lips formed along the longitudinal free edges of the legs, said lips each having a generally L-shaped configuration including a first portion projecting generally at right angles from the plane of the associated leg and a second portion projecting generally at right angles from the first portion of the lip, a number of preformed tabs integrally projecting from the legs at longitudinally spaced location situated between successive lips, said tabs projecting generally at right angles from the plane of the legs in a plane substantially parallel to the said first portion of said lips, said tabs being dimensioned to be received through apertures in a connecting element and deformed against the connecting element for connection of the reinforcement member to another similar reinforcement member, the opposite sides of each tab in the longitudinal direction of the legs being spaced from the adjacent ends of the adjacent lips so as to define sufficient space for receiving the connecting member placed across the leg in said space with the tabs acting as fasteners securing the connecting member to the leg.

References Cited
UNITED STATES PATENTS

| | | | |
|---|---|---|---|
| 1,119,066 | 12/1914 | Chamberlain | 52—648 |
| 1,868,108 | 7/1932 | Lachman | 52—666 |
| 2,167,525 | 7/1939 | Rosendale | 287—189.36 |
| 2,246,151 | 6/1941 | Vrooman | 52—648 |
| 2,316,829 | 4/1943 | Zecca | 287—189.36 |

FOREIGN PATENTS 1,025,600  1/1953  France.

FRANK L. ABBOTT, *Primary Examiner.*

RICHARD W. COOKE, JR., *Examiner.*

G. C. MUELLER, *Assistant Examiner.*